United States Patent
Craig et al.

(10) Patent No.: US 6,882,847 B2
(45) Date of Patent: Apr. 19, 2005

(54) FRACTIONAL REUSE THROUGH CHANNEL ALLOCATION TIERING

(75) Inventors: Stephen Craig, Tullinge (SE); Fredric Kronestedt, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 464 days.

(21) Appl. No.: 09/818,341

(22) Filed: Mar. 26, 2001

(65) Prior Publication Data

US 2004/0203806 A1 Oct. 14, 2004

Related U.S. Application Data

(60) Provisional application No. 60/211,841, filed on Jun. 15, 2000.

(51) Int. Cl.[7] ............................................... H04Q 7/20
(52) U.S. Cl. ....................... 455/450; 455/509; 455/464
(58) Field of Search ................................ 455/447, 450, 455/464, 451, 509, 452.1, 456.5, 446, 422.1, 423; 370/329, 335, 337, 328–333, 341

(56) References Cited

U.S. PATENT DOCUMENTS

| | | | | |
|---|---|---|---|---|
| 5,365,571 A | | 11/1994 | Rha et al. ..................... 379/59 |
| 5,455,962 A | | 10/1995 | Kotzin ....................... 455/33.1 |
| 5,613,198 A | * | 3/1997 | Ahmadi et al. ............. 370/337 |
| 5,722,043 A | * | 2/1998 | Rappaport et al. ........ 455/452.1 |
| 5,946,625 A | | 8/1999 | Hassan et al. ............... 455/447 |
| 6,038,455 A | * | 3/2000 | Gardner et al. ............. 455/447 |
| 6,047,186 A | * | 4/2000 | Yu et al. ...................... 455/446 |
| 6,212,385 B1 | * | 4/2001 | Thomas et al. ............. 455/447 |
| 6,353,600 B1 | * | 3/2002 | Schwartz et al. ........... 370/328 |
| 6,415,161 B1 | * | 7/2002 | Fujita ......................... 455/561 |

FOREIGN PATENT DOCUMENTS

| | | |
|---|---|---|
| EP | 0 765 096 A2 | 3/1997 |
| WO | WO 99/56421 | 11/1999 |
| WO | WO 00/16435 | 3/2000 |

OTHER PUBLICATIONS

PCT; International Search Report for PCT/SE 01/01299; Jan. 25, 2002.

* cited by examiner

Primary Examiner—CongVan Tran

(57) ABSTRACT

A cellular telecommunications method and system for fractional reuse of resources through channel allocation tiering, thereby increasing the spectral efficiency of the telecommunications system. A number of available channels in a cell are divided into logical groups, each of which share the same radio resources. The system reduces or eliminates interference using a number of techniques, such as interference diversity, interference suppression and/or interference avoidance. This utilization of resources in the system will create a spectrally efficient network or cell and enable a reuse less than one.

16 Claims, 3 Drawing Sheets

FRACTIONAL REUSE THROUGH CHANNEL ALLOCATION TIERING

CROSS-REFERENCE TO RELATED APPLICATION

This Application for Patent claims the benefit of priority from, and hereby incorporates by reference the entire disclosure of, co-pending U.S. Provisional Application for Patent Ser. No. 60/211,841, filed Jun. 15, 2000.

BACKGROUND OF THE PRESENT INVENTION

1. Field of the Invention

The present invention relates generally to a cellular communications system and in particular to increase the spectral efficiency of the cellular communications system using fractional reuse through channel allocation tiering (CHAT).

2. Background and Objects of the Present Invention

Frequency Division Multiple Access (FDMA) and Time Division Multiple Access (TDMA) are widely accepted multiple access communication methods currently adopted in the wireless industry. Particularly, the combination of both multiple access methods, e.g., Global System for Mobile communications (GSM) is the most popular and global wireless communication access method. Due to the rapidly increasing demand and use of mobile radio communications, new services and features are entering the market. These services, e.g., audio and video, require the network to support high bit rate services at the same time as traditional speech services continue to expand. With the acquisition of new sites becoming increasingly difficult, efficient utilization of the limited frequency spectrum is required, at the same ensuring that link quality is maintained at an acceptable level.

To illustrate techniques that enhance spectral efficiency, consider the commonly used Global System for Mobile communications (GSM). GSM operates in either the 900 MHz, the 1800 MHz or the 1900 MHz frequency ranges. Taking for example, GSM operating in the 900 MHz range, there are two frequency bands allocated for uplink and downlink traffic. Each frequency band is frequency divided into a number of frequency carriers, e.g., 124 frequency carriers, each of which utilizes 200 kHz of spectrum. Each carrier is further divided into time slots, e.g., eight time slots. In general, one base station can contain one or more sector cells. In each sector cell, there are a number of communication units, e.g., transceivers.

Radio resource (RR) hopping can be implemented in the system. The best example of RR hopping is frequency hopping. Frequency hopping schemes can be used in the system, in addition to other schemes, to enhance performance and reduce interference, as is well known in the art. In this instance, each of the transceivers may operate at one specific frequency and the signals hop from one transceiver to another, e.g., baseband frequency hopping, or in some cases each transceiver utilizes several frequencies, by hopping between frequencies, and transmits only one signal all the time, e.g., synthesized frequency hopping.

In general, when a service session radio resource is changed through time, interference is reduced because the service session is time and frequency dependent. For example, a dip in the transmission channel due to multipath fading or other factors affecting the channel usually occurs at a frequency in a given instant of time. When the channel frequency hops from one frequency to the next, the dip occurring in the channel will only affect this channel during a part of the dip while at this frequency or even only at a time slot in this frequency. Therefore frequency hopping improves performance, particularly in combination with coding and interleaving. Moreover, planning of cellular networks is done to improve spectral efficiency using a number of methods such as frequency hopping and adaptive antennas. Frequency hopping could be used to reduce the effect of interference in a system, as described hereinabove. Adaptive antennas could also be used, as could a number of other techniques such as link adaptation, transmitter diversity, and advanced receiver algorithms.

The combination of a number of such techniques could increase spectral efficiency to the point where fully loaded one-reuse networks are likely to become feasible in terms of service quality. Taking spectral efficiency beyond fully loaded one-reuse means either introducing complicated statistical multiplexing techniques or reusing the same frequency multiple times within a cell. The latter alternative is simpler and provides a smooth evolution for existing mobile communications systems. If frequencies are to be reused multiple times within a cell, methods are needed to manage the potentially severe intracell interference that could occur. One technique is so-called Spatial Division Multiple Access (SDMA) which utilizes narrow-beam adaptive antennas to allocate the same radio resources to users in different directions from the base station. The drawback with SDMA is that mobility management is complicated, since complex intracell handover and beam management algorithms are needed if users on the same channel are to be kept spatially separated. Moreover, diversity combining from multiple beams can generally not be used since it either introduces intracell interference or further complicates beam management or both. Intracell interference will cause severe performance degradation since there is no interference diversity within the cell and there is no possibility to use interference suppression techniques. This is because RR hopping sequences and codes, where used, are allocated on a per cell basis.

A better option is the simpler technique described hereinbelow, that can raise the spectral efficiency of cellular networks and make fully loaded one-reuse networks effectual in terms of service quality without requiring complicated mobility management and statistical multiplexing procedures. The present invention overcomes the limit of fully loaded one-reuse networks in terms of a lack of available channels without dramatically increasing the complexity of the system. The invention described hereinafter is both a technique to raise the spectral efficiency of cellular networks and a method to enable reuse less than one, also known as fractional reuse.

SUMMARY OF THE INVENTION

The present invention describes a method and system for fractional reuse of resources through channel allocation tiering (CHAT), thereby increasing the spectral efficiency of the telecommunications system. A number of available channels in a cell are divided into logical groups, each of which partially or fully share the same radio resources. The system reduces or eliminates collision using a number of techniques, such as interference diversity, interference suppression and/or interference avoidance. This utilization of resources in the system will create a spectrally efficient network or cell and enable a reuse less than one.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
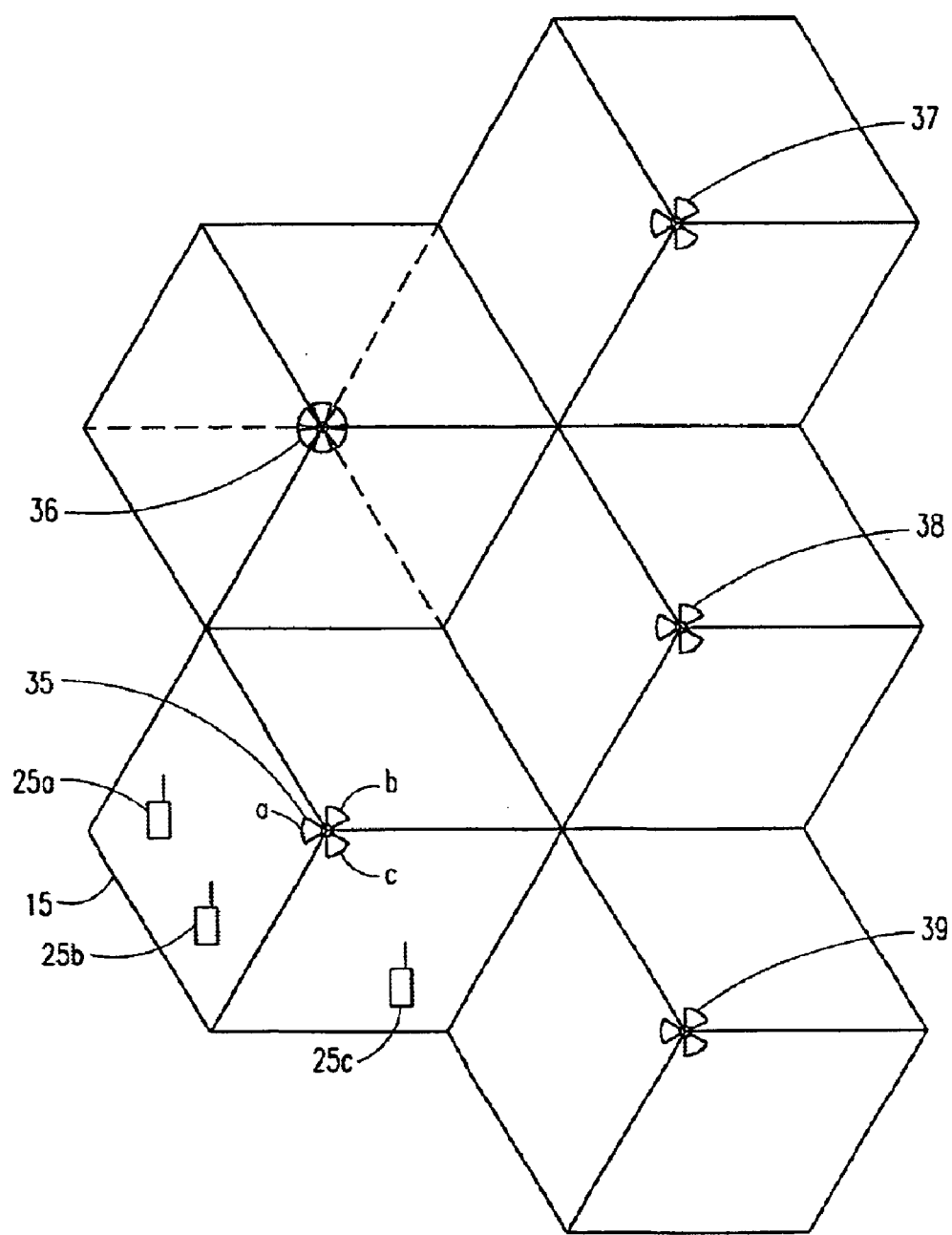
FIG. 1 illustrates an exemplary cell layout in a cellular system in accordance with the present invention.

FIG. 1 illustrates an exemplary cell layout in a wireless radio communication system. In a wireless radio communication system, a cell 15 is divided into a number of sectors, e.g., 3 sectors or 6 sectors. Each sector has an antenna 35a that sends and receives signals to the mobile stations in that sector. As will be explained, hereinbelow, with respect to FIG. 3, the available channels, in a cell or in all sectors, will share the same radio resources. In an embodiment of the present invention, the available channels partially or fully sharing the same resources are preferably spatially separated, e.g., channels available in one sector will share the same radio resources with channels available in another sector. As will be explained in detail hereinafter with reference to FIG. 3, available channels that share the same radio resources are often, but not necessarily, spatially separated, have different training sequences, and have different radio resources hopping sequences.

Figure 2:
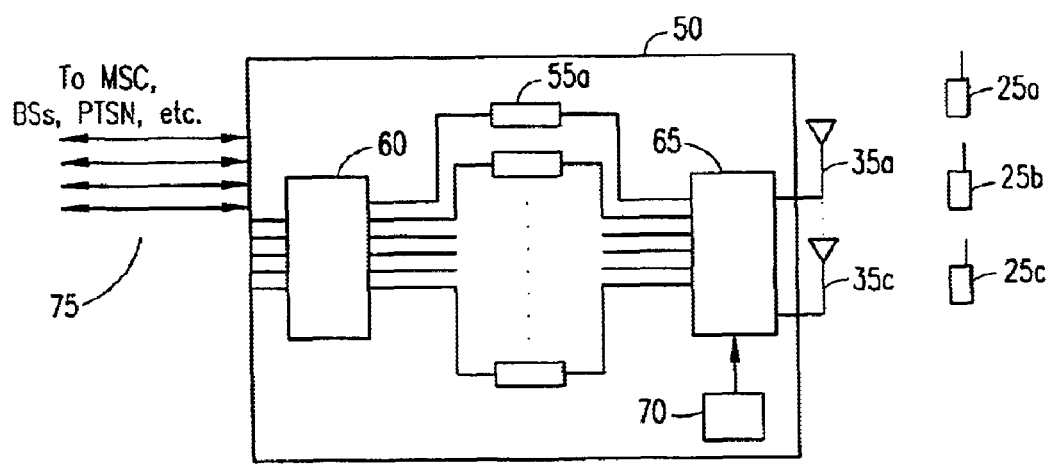
FIG. 2 illustrates an exemplary base station for performing the channel allocation tiering (CHAT) technique of the present invention.

FIG. 2 illustrates a base station in a cell having a number of transceivers 55. Each transceiver as described hereinafter is associated with a channel. The channels are divided into groups, called tiers, wherein all tiers can partially or fully share the same radio resources available in the cell. The base station is connected 75 to a Mobile Switching Center (MSC), to other base stations and to other network elements, as well known in the art. Also, the channels in each group may be sent using different antennas (35a, 35c) where the antennas are spatially separated. The base station includes a divider 65 that divides the transceivers 55 and a controller 70 that controls the radio resources hopping sequence. The controller also is in charge of the training sequence assignments and other necessary functionalities described hereinafter with reference to FIG. 3.

Figure 3:
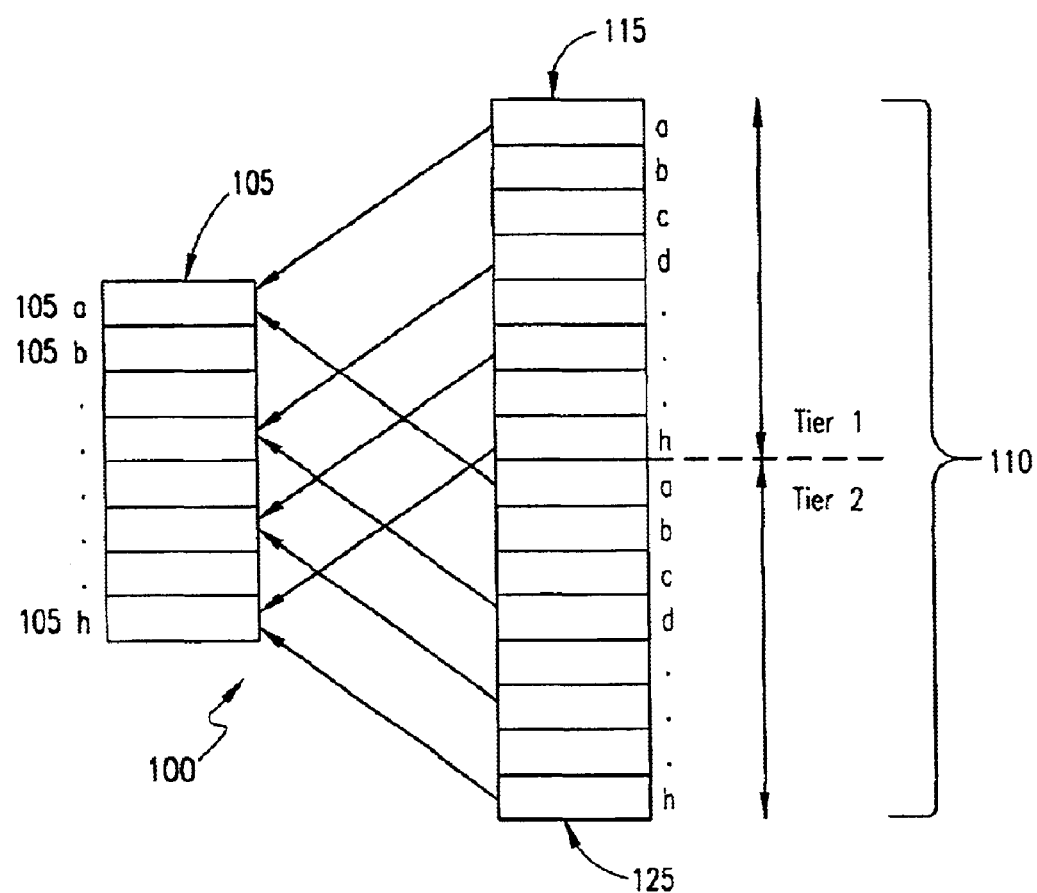
FIG. 3 illustrates the channel allocation tiering (CHAT) concept of the present invention in a cellular system.

The present invention increases the spectral efficiency performance of a cellular radio communication system using fractional reuse through channel allocation tiering (CHAT). FIG. 3 illustrates the channel allocation tiering (CHAT) concepts in a preferred embodiment of the present invention. A number of channels ($N_{ch}$) are commonly used in each cell. One or more channels correspond to each user depending on the service provided or the user demand. In a preferred embodiment of the present invention, each channel utilizes one transceiver. For example, if a user is wishing to have high speed access to services such as video and/or audio streaming, the service for the user is allocated several channels. These several channels could be represented by a longer time period in a TDMA system. The high rate services will necessitate a number of transceivers each corresponding to a channel. However, in some cases, the carrier bandwidth is limited, i.e., the frequencies and/or time slots are fully used and sharing is required to accommodate the number of transceivers used to perform the services in the cell. This as mentioned herein will provide reuse of less than one in the system. Channels are split into a number of logical groups (channel tiers), each logical group being of a maximum size $N_{rr}$. This maximum size $N_{rr}$ of each channel tier being the number of radio resource (RR) units allocated to each cell. The fractional reuse of the channel allocation tiering (CHAT) is made by sharing these radio resources among different channels in different tiers. In a preferred embodiment of the present invention, the available channels 110 are split into a number of logical groups "channel tiers", e.g., two tiers as shown in FIG. 3. The two tiers, tier 1 (115) and tier 2 (125), utilize the same radio resources 105 in the system. Two channels, one from tier 1 (115a) and one from tier 2 (125a), share the same radio resource 105a. In general, all tiers partially or fully share the same radio resources. However, according to a preferred embodiment of the present invention sharing is very flexible. A channel may share its resources with other channels in different tiers, or it may use the available radio resource by itself without sharing. When sharing is performed by the channels, reduction in the number of collisions is required. A number of techniques may be used to achieve the lowest possible collision rate. According to a preferred embodiment of the present invention, all tiers are allocated different radio resources (RR) hopping sequences. Also, interference suppression techniques may be employed in the receivers. Moreover, the interference suppression techniques may be further enhanced by employing different training sequences for each tier. A further feature in the system that may reduce the collision rate is by employing interference avoidance. This interference avoidance may be accomplished by spatial separation using adaptive antennas, enforced silence or/and spatial separation or any other known technique. Interference diversity, interference suppression and interference avoidance techniques described herein may be used separately, or to achieve maximum performance all three mechanisms could be used concurrently.

Interference diversity, as mentioned above, could be employed in the system wherein each of the logical groups or channel tiers are allocated different radio resource (RR) hopping sequences. For example, a different frequency hopping sequence may be used for each tier. This could be defined by the Hopping Sequence Number (HSN) which determines the actual hopping sequence. A Mobile Allocation Index Offset (MAIO) management method may be used to distribute hopping sequences among the different mobiles within a tier. This will remove any co-channel interference within each tier. Each tier can have a different hopping sequence, which will lessen the effect of interference by introducing interference diversity.

Each logical group or channel tier is allocated a different training sequence. For example, each channel tier is allocated one of the eight training sequences as stated in the GSM standards. However, additional training sequences that have better cross-correlation properties, could preferably be used. Nonetheless, if using the currently available training sequences, which have sub-optimal cross-correlation properties, a timing offset could be implemented between the tiers to reduce the correlation between the training sequences. This is likely to boost the performance of the interference suppression algorithms used in the receivers. Any of the interference suppression algorithms either for single or multi-branch receivers, which are well known in the art, could be used in the preferred embodiments of the present invention.

Interference avoidance, as described hereinabove, may be implemented in the system to avoid interference. For example, this interference avoidance may be implemented using spatial separation through the use of adaptive antennas in the cell. Multiple beamforming adaptive antennas may be used in sectors of the cell to reduce the interference between users in that cell by spatially separating them. Moreover, enforced silence may be employed to avoid intracell interference. A silence burst may be forced on a user channel having the most interference in the cell. These silence bursts should be managed and considerably few in number to avoid any quality degradation. This silence burst may preferably silence interferers based on a Quality-of-Service (QoS) profile of the service being used. The enforced silence may be used in any system that has the ability to use interference suppression techniques, as mentioned hereinabove, or it may be used in systems in which interference suppression techniques mentioned hereinabove are not possible.

In a preferred embodiment of the present invention a cellular telecommunications network has a number of frequencies and a traffic load that necessitates the use of a number of transceivers in each cell. When the number of needed transceivers is greater than the number of frequencies in that same cell, fractional reuse, as described hereinabove, is the ideal method that may be used to increase the spectral efficiency of the network or cell. This is usually the case in cells where the number of transceivers exceeds the number of available frequencies. In this case, the number of transceivers are divided into multiple logical groups, where each logical group is characterized by a different training sequence, a different hopping sequence, and are preferably spatially separated.

For example, in a GSM/EDGE network with 15 non-broadcast control channel (non-BCCH) frequencies and a traffic load requiring 20 installed transceivers per cell, the 20 transceivers, each associated with a channel, could be divided into two 10-transceiver groups (channel tiers). Channels from the two tiers will share the 15 available frequencies. The collision rate is reduced by having each tier use a different hopping sequence. Other techniques such as spatial separation between tiers and/or different training sequences in each tier may be used to avoid/reduce interference in the system, as described in detail hereinabove.

The amount which the channel tiers in a cell will interfere with each other is dependent on the load in each tier. The allocation of traffic between the tiers will therefore affect the interference levels in the other tiers. An intelligent channel allocation algorithm has the potential to maximize performance of the various services operating in the CHAT cell. Hence, channel allocation to the different tiers should preferentially be made with consideration of the current load in the tiers, any measure of the prevailing quality of the active service sessions, the Quality-of-Service (Qos) requirements of the service sessions, the direction of the different users with respect to the base station, the distance of the different users from the base station, the pathloss of the different users from the base station or equivalently their received signal strengths, the geographical or radio distance from the different users to the cell border, or any combination of the above.

As mentioned earlier, channel allocation tiering (CHAT) is preferably used when the number of frequencies is less than the number of channels/transceivers in the system. However, CHAT may be used in systems where the number of frequencies are more than the number of required transceivers. The number of transceivers, in this case, are preferably divided into groups to allow a lower hardware load of e.g. $\frac{1}{3}$. For example, if we have 18 non-BCCH frequencies and traffic that requires 12 transceivers, it could be preferred to divide the 12 transceivers into two 6-transceiver tiers. This allows the hardware load to be $\frac{6}{18}$, which is a third which allows inter-base station synchronization and MAIO management to remove the intrasite co-channel interference. In other words, all co-channel interference within a tier group is reduced/removed. Moreover, the above mentioned interference diversity, interference suppression and/or interference avoidance techniques may be used. This will further reduce the probability of co-channel intrasite collision.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A method for increasing the spectral efficiency of a wireless telecommunications system within a cell, said method comprising the steps of:

dividing a plurality of channels within the cell of said wireless telecommunications system into a plurality of logical groups for the cell;

mapping a first group of said plurality of logical groups onto a first plurality of radio resources within the cell; and mapping at least one other group of said plurality of logical groups for the cell onto a second plurality of radio resources within the cell, at least one radio resource in said second plurality of radio resources corresponding to at least one radio resource in said first plurality of radio resources, wherein said steps of mapping said first group and mapping said at least one other group are performed according to a communication measure, where the communication measure is selected from the group consisting of: current load in said plurality of logical groups, prevailing quality of active service sessions, Quality-of-Service requirements of service sessions, directions of users with respect to a base station, distance of users from a base station, path loss of users from a base station, users received signal strengths, geographical distance from users to a cell border, radio distance from users a cell border and any combination of communication measures.

2. The method according to claim 1, wherein each of said plurality of logical groups has a different radio frequency hopping sequence.

3. The method according to claim 1, wherein each of said plurality of logical groups has a different training sequence.

4. The method according to claim 1, wherein each of said plurality of logical groups being spatial separated.

5. The method according to claim 1, wherein said first plurality of radio resources and said second plurality of radio resources are substantially the same.

6. The method according to claim 1, further comprising the step of:

enforcing silence on an interfering channel within said plurality of logical groups.

7. The method according to claim 6, wherein said step of enforcing silence is based on a quality of service (QoS) measure.

8. The method according to claim 1, wherein a timing offset is applied between said plurality of logical groups mapped onto said plurality of radio resources.

9. A wireless telecommunications system for increasing the spectral efficiency of a cell within a wireless telecommunications system, said system comprising;
 a divider for dividing a plurality of channels within a cell of said wireless telecommunications system into a plurality of logical groups for the cell;
 mapping means for mapping said plurality of logical groups onto a plurality of radio resources for the cell, and
 a determining means for determining a communication measure used to aid said mapping means in mapping said plurality of logical groups onto said plurality of radio resources where the communication measure is selected from the group consisting of: current load in said plurality of logical groups, prevailing quality of active service session, Quality-of-Service requirements of service sessions, directions of users with respect to a base station, distance of users from a base station, path loss of users from a base station, users received signal strengths, geographical distance from users to a cell border, radio distance from users to a cell border and any combination of communication measures.

10. The system according to claim 9, wherein said mapping means comprises flexibly mapping said plurality of logical groups onto said plurality of radio resources.

11. The system according to claim 9, further comprising implementing means for implementing different radio frequency hopping sequences in each of said plurality of logical groups.

12. The system according to claim 9, further comprising means for using different training sequences in each of said plurality of logical groups.

13. The system according to claim 9, further comprising separating means for spatially separating said plurality of logical groups.

14. The system according to claim 9, further comprising silencing means for enforcing silence for an interfering channel.

15. The system according to claim 14, wherein said silencing means comprises enforcing silence on a user based on a quality of service (QoS) measure.

16. The system according to claim 9, further comprising offset means for applying a time offset between said plurality of logical groups mapped on said plurality of radio resources.

* * * * *